Jan. 15, 1957 S. ROTHMAN 2,777,197
KNIFE BLADE HOLDER AND GUIDE
Filed May 11, 1954 2 Sheets-Sheet 1
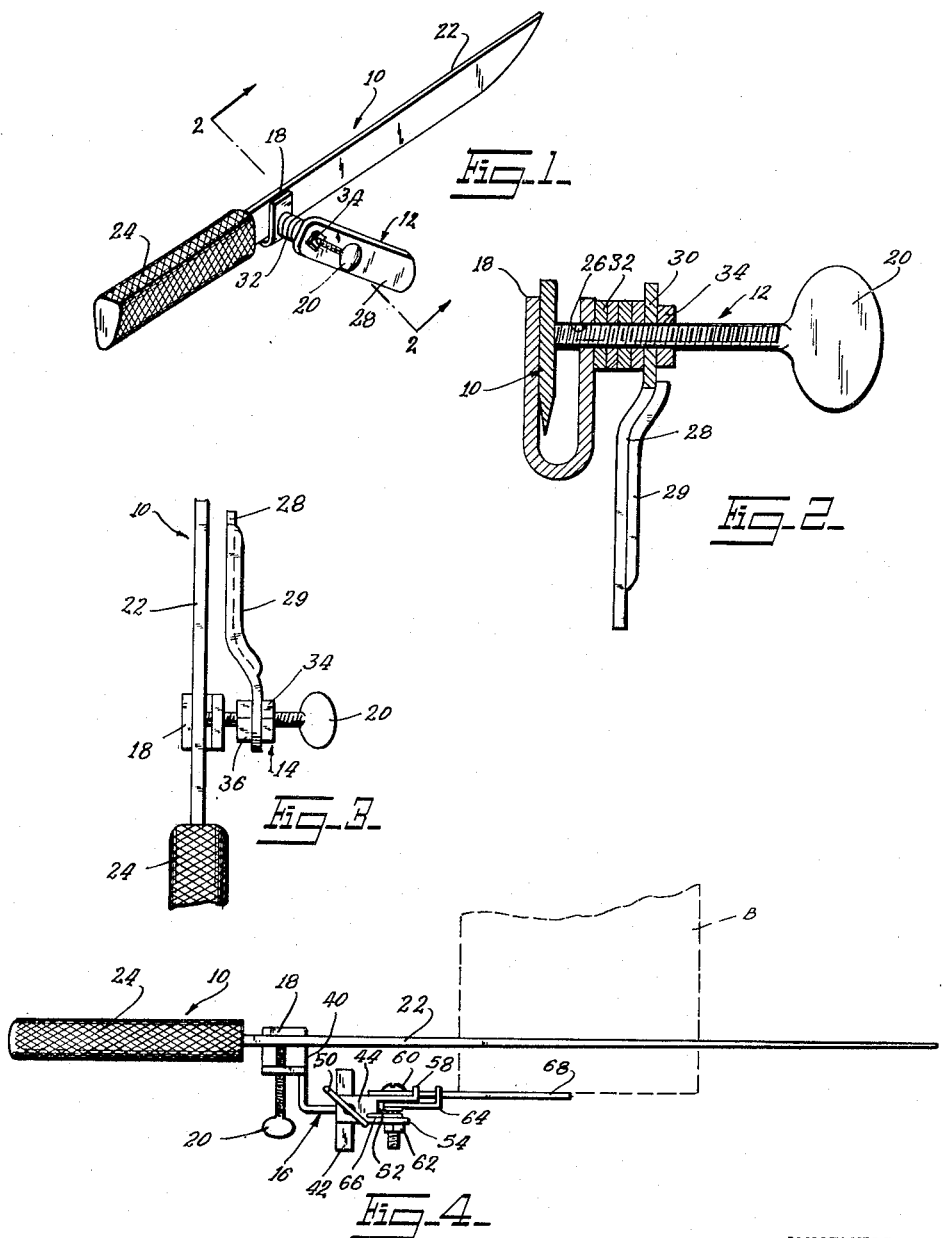
INVENTOR.
STANLEY ROTHMAN
BY
ATTORNEY Jan. 15, 1957   S. ROTHMAN   2,777,197
KNIFE BLADE HOLDER AND GUIDE
Filed May 11, 1954   2 Sheets-Sheet 2
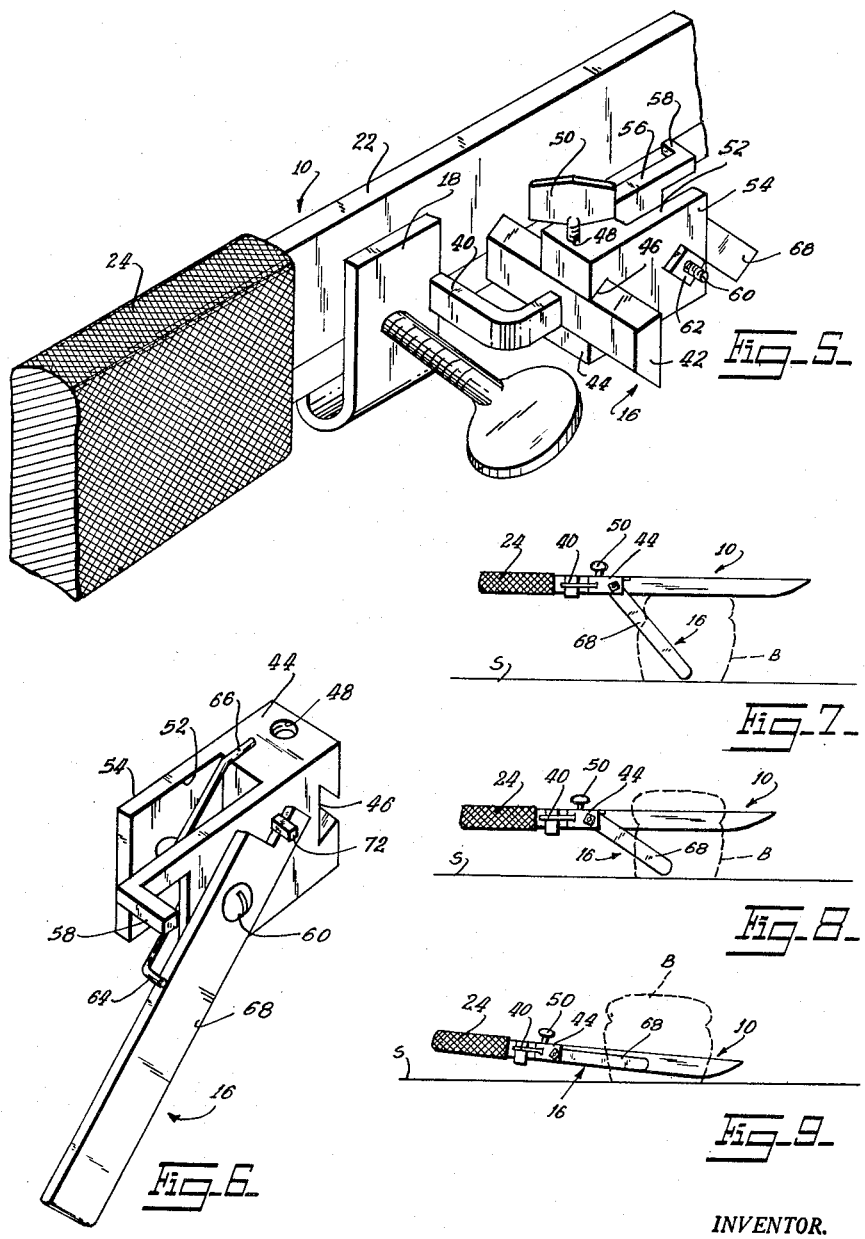
INVENTOR.
STANLEY ROTHMAN
BY
ATTORNEY United States Patent Office 2,777,197
Patented Jan. 15, 1957

2,777,197

KNIFE BLADE HOLDER AND GUIDE

Stanley Rothman, Bronx, N. Y.

Application May 11, 1954, Serial No. 428,904

4 Claims. (Cl. 30—284)

This invention relates to a device adapted to be used in association with a conventional kitchen knife, to provide a guide blade spaced laterally of the knife blade to an adjusted, predetermined extent, for the purpose of cooperating with the knife blade in cutting slices of uniform thickness from a loaf of bread, meat loaf, or the like.

One important object of the present invention is to provide a device of the type stated which, in one form of the invention, can be swiftly clamped to or disengaged from a conventional knife, with maximum speed and minimum difficulty.

Another object is to provide, in a device as stated, a construction which will not require modification or redesign of a knife in any manner.

Another object is to permit the device to be used in association with any of various knives differing substantially from one another in respect to size and/or shape.

Still another object is to incorporate, in a device of the type stated, a screw element which will discharge a plurality of functions, namely, the function of a clamping element, a means for holding a plurality of spacer devices, and a pivot shaft for the guide blade.

Still another object is to provide guide means as stated, that does not interfere in any manner with proper visual observation of the article that is being cut.

Yet another object is to provide, in another form of the invention, means for adjusting the guide blade transversely of the knife blade to a selected spaced relationship relative to the knife blade, means for swiftly securing the guide blade in the selected position of adjustment, means normally tending to swing the guide blade downwardly into position against the end of the article to be cut, and means limiting the swinging movement of the guide blade in opposite directions beyond a predetermined extent.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a conventional kitchen knife, equipped with a combination blade holder and guide formed in accordance with the present invention.

Fig. 2 is an enlarged transverse sectional view substantially on line 2—2 of Fig. 1.

Fig. 3 is a fragmentary top plan view of a knife and guide, in which the guide has been slightly modified in construction.

Fig. 4 is a top plan view of a knife and of a third form of guide, a loaf of bread being cut being illustrated fragmentarily and in dotted outline.

Fig. 5 is an enlarged perspective view of the third form, the knife being illustrated fragmentarily and in dotted outline.

Fig. 6 is a perspective view of the guide blade and support block, per se, of the form of Figs. 4 and 5, showing the end opposite that viewed in Fig. 5.

Fig. 7 is a view showing the device of Fig. 4 and the associated knife, as they appear immediately before slicing of an article.

Fig. 8 is a view similar to Fig. 7 in which the slice has been partially cut.

Fig. 9 is a view similar to Figs. 7 and 8 in which the slice has been completely cut.

In all figures of the drawing, the reference numeral 10 has been applied generally to a conventional kitchen knife. In the drawings, three different forms of the invention are shown in association with said knife, these including a first form designated generally at 12 (Figs. 1 and 2), a second form designated at 14 (Fig. 3), and a third form designated generally at 16 (Figs. 4–9). Considering first the guide 12 of Figs. 1 and 2, this includes a knife-engaging member 18, shaped as a clamp member of U-shaped adapted to embrace the knife blade. Cooperating with the member 18 is a clamp screw 20 which is adapted to bind the member 18 against the blade 22 of the knife, adjacent the handle 24 of said knife. As shown in Fig. 2, the blade 22 is forced against the inner surface of one of the legs of the member 18, the shank of the screw 20 being threadedly engaged in a tapped opening 26 formed in the other leg, the screw being threadable against the knife blade to cause the knife blade to be clampably engaged between the end of the screw shank and the first-named leg of the clamp member.

It will be seen that this construction permits the device to be readily attached to or disconnected from any of various kitchen knives, differing from one another with respect to the shape and/or size of their blades and handles.

An elongated, blunt-ended guide blade 28 has an inwardly offset free end portion, and is formed with a longitudinal lip 29 facilitating grasping thereof. At its inner end, blade 28 has a smooth-walled opening 30 receiving the screw shank, for mounting of the guide blade for pivotal adjustment within a plane paralleling that of the knife blade. A plurality of spacer washers 32, all formed with smooth-walled openings receiving the screw shank, is interposed between the inner end of guide blade 28 and the apertured leg of the member 18, to space the guide blade a selected distance away from the knife blade. The distance between the knife and guide blades will be equal to the thickness of a slice cut from an article such as a loaf of bread B, since in use, the guide blade 28 is swung downwardly to an acute-angular relationship relative to the knife blade. Thereafter, a nut 34 threaded on the screw shank is threaded against the outer surface or face of the guide blade, to frictionally bind the guide blade between the nut and the outermost spacer washer, thereby to prevent the guide blade from swinging loosely upon the screw shank. In use, the guide blade is positioned against the end of the loaf or other article, with the knife blade poised over said article. The knife blade is then used in the regular manner to cut off a slice, the guide blade moving downwardly along the outer surface of the slice being cut.

When the free or lower end of the guide blade engages a supporting surface during the slicing operation, further downward movement of the knife blade will cause the guide blade to pivot slowly about the screw shank, until, at the completion of the operation, the guide blade and knife blades are substantially parallel. In other words, the lock nut 34, while preventing loose swinging movement of the guide blade, does not completely prevent the blade from pivoting about the screw shank when sufficient downward pressure is exerted during the slicing operation.

In Fig. 3, the guide 14 is identical in all respects to that shown in Figs. 1 and 2, with the exception that instead of a plurality of spacer washers 32, there is utilized a second lock nut 36 threaded on the screw shank. The lock nuts 34, 36 are advanced into engagement with opposite faces of the guide blade 28, in selected positions to which the guide blade is adjusted transversely of the knife blade.

In Figs. 4-9 there is illustrated a construction in which the member 18 is integrally or otherwise rigidly secured to one end of an outwardly and laterally projecting angular support bar 40 reduced in width relative to member 18, the outer end portion of the support bar extending forwardly in parallelism with the knife blade. On the forwardly projecting end of the support bar there is fixedly mounted a cross head formed as a dovetail tongue element 42, said cross head being welded or otherwise fixedly secured intermediate its ends to support bar 40, and being disposed transversely of the knife blade, in laterally spaced relation to said knife blade.

A guide blade support block 44 is slidably mounted upon the tongue 42, and projects forwardly from said tongue. The block 44, in its rear surface, has a transversely extending dovetail groove 46 opening upon the opposite side surfaces of the block 44, and complementing the tongue 42 to receive said tongue. In this way, the block 44 is mounted upon the tongue 42 for adjustment transversely of the knife blade, in a direction toward or away from said knife blade, thereby to selectively vary the spacing between the block 44 (and hence the guide blades supported thereby) and the knife blade. In each position to which the block 44 is so adjusted, said block can be clampably engaged with the tongue 42, the block 44 having a tapped opening 48 receiving a clamping screw 50 that is adapted to be advanced into engagement with the tongue 42 to hold the tongue and block against relative movement after the block has been adjustably positioned.

At its front end, the block 44 is deeply recessed to provide a slot 52 opening upon said front end of the block, the slot defining forwardly projecting, transversely spaced arms 54, 56 on the block. Arm 56 is integrally provided with a forwardly projecting extension terminating at it free end in a laterally extended stop lug 58.

Arms 54, 56 are formed with transversely aligned, smooth-walled openings receiving a screw 60, provided with a nut 62. The portion of the screw shank extending across slot 52 has a coil spring circumposed thereabout, one end 64 of the spring projecting forwardly out of the open end of the slot, and the other end 66 of the spring being extended rearwardly to overlie the top surface of the block 44. The end 64, at its forwardly projecting terminus, has a lateral extension bearing against the top edge of an elongated guide blade 68, intermediate the ends of said guide blade. Adjacent its inner end, the guide blade 68 has an opening registering with the openings of arms 54, 56, to receive the screw shank. The opening of the guide blade is smooth-walled, for pivotal mounting of the guide blade upon the screw 60. At its inner end, guide blade 68 has a longitudinal extension 70, adapted to bear against a laterally projected stop lug 72 formed upon the block 44.

The stop lugs 72, 58 cooperate to limit swinging movement of the guide blade 68 in opposite directions. In other words, when the guide blade 68 is swung downwardly at its outer or forwardly projected end (to the position shown in Fig. 6), the extension 70 will be engaged by the stop lug 72 to limit further swinging movement of the guide blade in this direction. When, however, the guide blade is swung in a reverse direction, upwardly about its pivot axis, it will automatically be engaged by the stop lug 58, again for the purpose of limiting swinging movement of the guide blade. The spring 64 is so tensioned as to yieldably but continuously exert pressure upon the guide blade tending to swing the blade downwardly to the lower limit of its pivotal movement.

In use of the device shown in Figs. 4-9, one first adjusts the block 44 along the tongue 42 to the selected position relative to the knife blade, for cutting of a slice of a desired thickness. Then, it is merely necessary that the member 18 be positioned against the blade at a selected location and clamped thereto, after which the knife handle is grasped in the knife-wielding hand of the user. Reference should now be had to Figs. 7-9, the knife and guide device being shown in their initial position in Fig. 7, preliminary to the cutting of the slice. As will be noted, the guide blade 68, at this stage of the operation, is in its downwardly swung position engaging a supporting surface S such as a table top.

As the slicing progresses, the parts move to the position shown in Fig. 8, the guide blade 68 slowly swinging upwardly about its pivot axis during the downward movement of the knife 10 toward the surface S. The spring, of course, yieldably opposes the upward swinging movement of the guide blade, and holds the free end of the guide blade against the supporting surface. The guide blade will, of course, throughout the slicing operation be positioned against the outer surface of the slice.

At the conclusion of the slicing operation, the knife blade reaches the supporting surface S, substantially simultaneously with movement of the guide blade 68 into a position parallel to the knife blade (Fig. 9). In this position of the guide blade, it is engaged by the stop lug 58, to prevent further upward swinging movement of the guide blade.

While I have illustrated and described the preferred embodiments of my invention, it is to be understood that I do not limit myself to the precise constructions herein disclosed and the right is reserved to all changes and modifications coming with the scope of the invention as defined in the appended claims.

Having thus described my invention, what I claim as new, and desire to secure by United States Letters Patent is:

1. A slicing guide for a knife having a blade portion and a handle portion, comprising a knife-engaging member adapted to be held against one of said portions, guide-blade-support means extending from said member, and a guide blade carried by said means, said blade being pivoted on said means to swing within a plane paralleling that of the knife blade, and being mounted for adjustment in a transverse direction toward and away from the knife blade, said means including a support bar rigid with said member and extending laterally outwardly therefrom, said means further including a tongue carried by the bar and extending transversely of the knife blade, and a block grooved complementarily to the tongue to receive the same, and slidably adjustable on the tongue to a selected spaced relationship to the knife blade, the guide blade being carried by said block.

2. A slicing guide for a knife having a blade portion and a handle portion, comprising a knife-engaging member adapted to be held against one of said portions, guide-blade-support means extending from said member, and a guide blade carried by said means, said blade being pivoted on said means to swing within a plane paralleling that of the knife blade, and being mounted for adjustment in a transverse direction toward and away from the knife blade, said means including a support bar rigid with said member and extending laterally outwardly therefrom, said means further including a tongue carried by the bar and extending transversely of the knife blade, and a block grooved complementarily to the tongue to receive the same, and slidably adjustable on the tongue to a selected spaced relationship to the knife blade, the guide blade being carried by said block, said means further including a screw carried by the block on which the guide blade is pivotally mounted.

3. A slicing guide for a knife having a blade portion and a handle portion, comprising a knife-engaging member adapted to be held against one of said portions, guide-blade-support means extending from said member, and a guide blade carried by said means, said blade being pivoted on said means to swing within a plane paralleling that of the knife blade, and being mounted for adjustment in a transverse direction toward and away from the knife blade, said means including a support bar rigid with said member and extending laterally outwardly therefrom, said means further including a tongue carried by the bar and extending transversely of the knife blade, and a block grooved complementarily to the tongue to receive the same, and slidably adjustable on the tongue to a selected spaced relationship to the knife blade, the guide blade being carried by said block, said means further including a screw carried by the block on which the guide blade is pivotally mounted, the block including stop lugs engaging the guide blade to limit swinging of the same in opposite directions.

4. A slicing guide for a knife having a blade portion and a handle portion, comprising a knife-engaging member adapted to be held against one of said portions, guide-blade-support means extending from said member, and a guide blade carried by said means, said blade being pivoted on said means to swing within a plane paralleling that of the knife blade, and being mounted for adjustment in a transverse direction toward and away from the knife blade, said means including a support bar rigid with said member and extending laterally outwardly therefrom, said means further including a tongue carried by the bar and extending transversely of the knife blade, and a block grooved complementarily to the tongue to receive the same, and slidably adjustable on the tongue to a selected spaced relationship to the knife blade, the guide blade being carried by said block, said means further including a screw carried by the block on which the guide blade is pivotally mounted, the block including stop lugs engaging the guide blade to limit swinging of the same in opposite directions, said means further including a spring on the screw engaging the guide blade and tensioned to resiliently urge the same in a downward direction.

References Cited in the file of this patent

UNITED STATES PATENTS

| | | |
|---|---|---|
| 417,859 | Conover | Dec. 24, 1889 |
| 601,509 | Fowler | Mar. 29, 1898 |
| 1,069,189 | Saltzman | Aug. 5, 1913 |
| 2,453,220 | Gustafson | Nov. 9, 1948 |

FOREIGN PATENTS

| | | |
|---|---|---|
| 124,068 | Austria | Aug. 10, 1931 |
| 355,106 | Great Britain | Aug. 20, 1931 |